Sept. 6, 1949. P. R. McEACHRAN 2,480,947
BRAKE SHOE CONSTRUCTION
Filed May 31, 1946 2 Sheets-Sheet 2
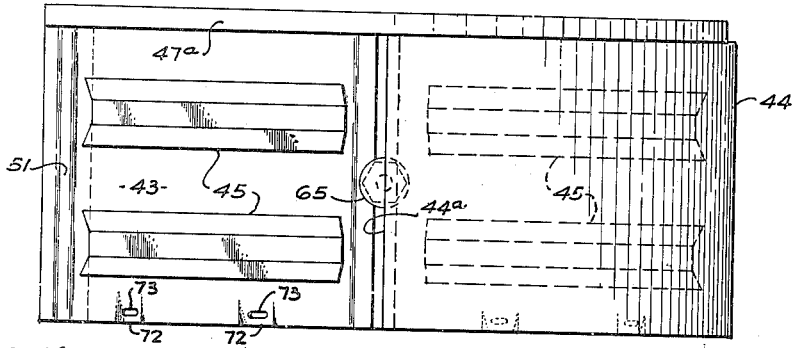
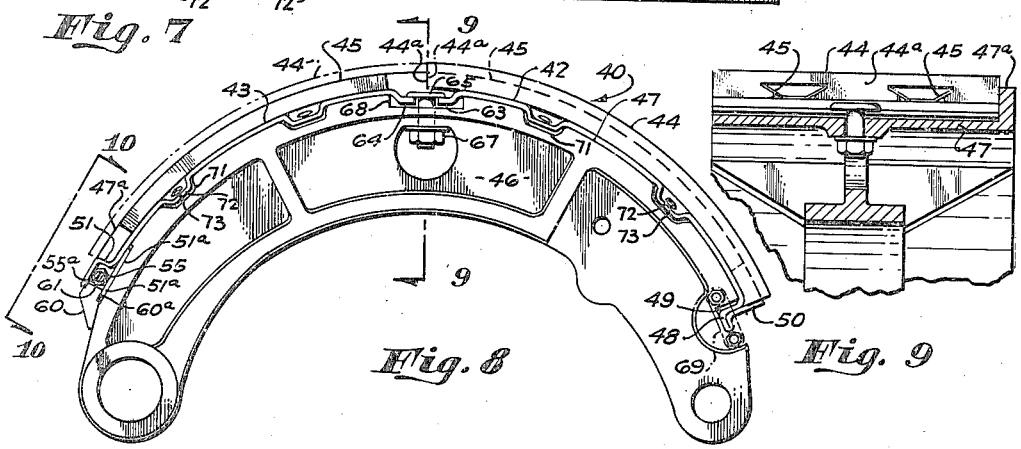
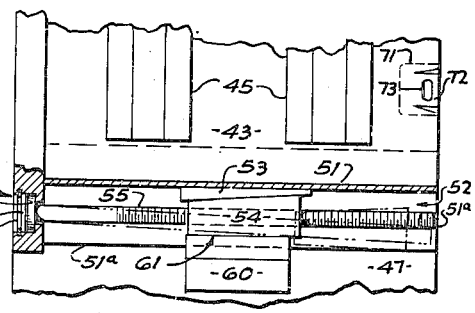
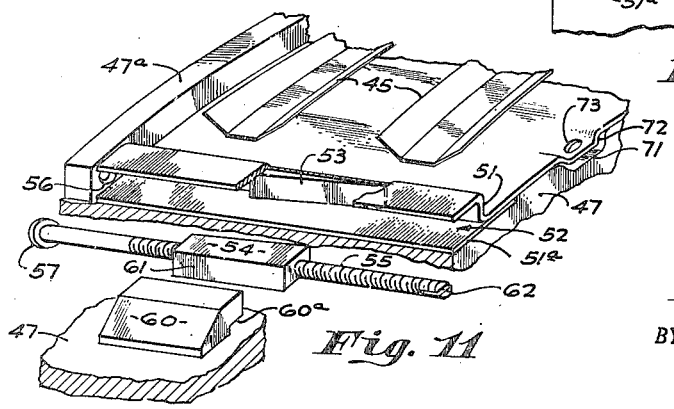
INVENTOR.
Paul R. McEachran
BY
ATTORNEY Patented Sept. 6, 1949

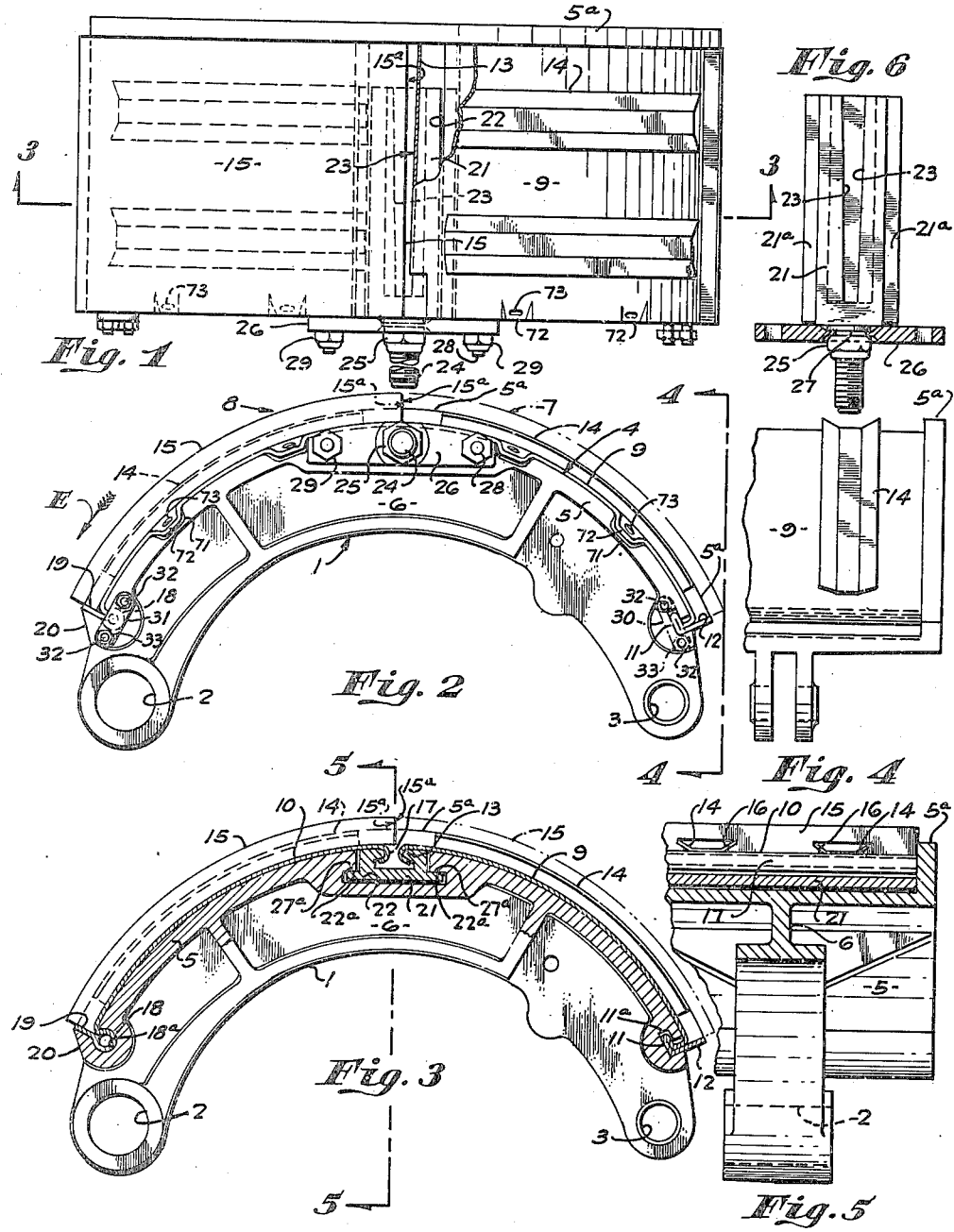

2,480,947

UNITED STATES PATENT OFFICE 2,480,947

BRAKE SHOE CONSTRUCTION

Paul R. McEachran, Downey, Calif.

Application May 31, 1946, Serial No. 673,466

10 Claims. (Cl. 188—234)

This application relates to brake-shoe constructions, of a type related to that shown in my co-pending application Serial Number 578,984, filed February 21, 1945, and pertains to a removable brake-shoe construction in which friction-element carrying brake shoes are slidably disposed upon a main support member and adapted for removal therefrom by lateral motion, whereby the device may be employed in constructions in which space is at a minimum.

Numerous forms of detachable brake-shoe constructions have heretofore been proffered, but the physical requirements of structures of this type have for the most part not adequately been met, as a result whereof but few of these prior-suggested forms of shoe construction have been found acceptable in the trade. Where removable shoe structures are adapted for heavy-duty use, as on trucks, trailers and busses, ample provision must be made for resistance of the operating stresses which are imposed, and to be "removable" in a true sense, the structure should admit of withdrawal of the brake-shoe unit in an axial direction (with reference to the cylindrical surface or "drum" against which the shoe acts in use) so that the shoe may be removed into and through the space closely adjacent such drum without requiring the removal of any great proportion of the ancillary structural parts. This removal must be such as to require a very small amount of work, so as to be accomplished in a minimum amount of time, with relatively unskilled labor.

In view of the above, one of the principal objects of this invention is to provide a brake-shoe construction which is readily removable from the brake assembly without requiring removal of the associated parts of the assembly, thereby making the device particularly adaptable to heavy installations such as are employed in trucks, trailers and busses, so that brake-shoe replacements may be made quickly and facilely.

A further object of the invention is to provide a removable brake-shoe construction employing a brake-shoe assembly comprising a friction element slidably mounted upon a base member and adapted for removal therefrom by relative motion in a longitudinal direction through the agency of longitudinally extending interlocking members on the friction element and base members, together with means for attaching the base member portions of the construction to a main brake assembly or support by relative movement in a direction normal to the relative movement between the friction element and its base member.

A further object of the invention is to provide a brake-shoe construction of the type above described, in which means are provided for longitudinal adjustment of the removable brake-shoe element in such manner as to positively locate the longitudinally slidable friction elements in fixed position with respect to the main support, whereby the associated friction elements are adapted to withstand the loads applied thereto in use.

A further object of the invention is to provide a brake-shoe construction of the type described, which is simple and inexpensive of manufacture, and which requires a minimum of skilled labor for installation.

The device of the present invention may comprise, essentially, a pair of removable brake-shoes adapted to cooperate to form one continuous braking surface, such brake-shoes being formed of elongated friction elements slidably disposed upon a base member through the agency of longitudinally extending interlocking means on such friction element and the subjacent base member, cooperating means on the subjacent base member and the associated brake-shoe support adapting such base member for sliding attachment upon such support by relative movement in a direction transverse to the direction of extension of the aforesaid longitudinal interlocking means, means for effecting longitudinal relative movement of the brake elements to cause the abutting end portions of the two friction elements to be brought into close compressional engagement with one another, and for maintaining such base members in engagement with such main support, together with locking means for retaining such removable brake-shoe members against transverse dislocation from such support. Other objects and features of this invention will be brought out in the ensuing description of two preferred embodiments thereof, or will be apparent from such description. The accompanying drawings illustrate these two embodiments, and referring thereto:

Fig. 1 is a partly broken away plan view of my removable brake-shoe element assembly, shown as applied to a brake-shoe support;

Fig. 2 is a side elevation thereof;

Fig. 3 is a longitudinal section as taken on line 3—3 of Fig. 1;

Fig. 4 is a fragmentary end elevation, as taken on line 4—4 in Fig. 2;

Fig. 5 is a transverse section as taken on line 5—5 in Fig. 3;

Fig. 6 is a plan detail of a locking and take-up member utilized to affix the removable brake-shoes to the brake-shoe support;

Fig. 7 is a view corresponding to Fig. 1, showing a modified form of my invention;

Fig. 8 is a partly fragmentary view of the form shown in Fig. 7, corresponding to the showing of Fig. 2;

Fig. 9 is a transverse sectional view as taken on line 9—9 in Fig. 8;

Fig. 10 is a fragmentary partly broken away view as taken on line 10—10 in Fig. 8; and Fig. 11 is an exploded perspective fragmentary detail of the end of the shoe construction illustrated in Fig. 10, showing the relationship between one of the brake-shoes and certain parts of the brake-shoe support in the operation of locking the shoe upon the support.

Referring to Figs. 1 through 6 of the drawings, the device of this invention may comprise a brake-shoe support 1 adapted to be mounted on the brake housing or other base member as upon a pivot attachment bearing 2 and an actuator attachment bearing 3, and presents a generally cylindrical outer surface portion 4 formed by a cylindrical flange member 5 provided with a lateral shoulder or edge projection of greater radius indicated at 5a. The brake-shoe support 1 may be provided with a web portion 6 to provide the desired structural strength, according to common practice in the art. This form of invention shows the use of two removable and cooperating brake-shoes, a front brake-shoe being illustrated at 7 and a rearward brake-shoe being indicated at 8. Both of the brake-shoes are removable according to this invention and are adapted to lie along the cylindrical surface portion 4. The use of the words "forward" and "rearward" in the designation of the two brake-shoes 7 and 8 is for purpose of description only, having reference to the direction in which the braking effort may be applied when the brake is in use, as indicated by the arrow E in Fig. 2. Similarly, the expression "cylindrical" is intended to connote a cylindric surface portion rather than a full cylinder, it being appreciated that a brake assembly of the expanding type will normally comprise a plurality (two or more) of separate friction elements each with a cylindric working surface, and adapted to engage a cylindrical drum member.

The removable brake-shoe 7 may comprise a base element 9 adapted to lie along the cylindrical surface 4 and is preferably provided at its forward end with an interlocking flange 11 adapted to be disposed within a transversely extending slot or groove 11a in the cylindrical flange portion 5 of the brake-shoe support 1, an upstanding flange 12 being preferably provided at the forward edge of the member 9 to engage upon the friction element associated with the member 9, as hereinafter described. At the rearward end of the member 7 the base element 9 is bent inwardly to form a laterally inclined interlocking flange 13.

The removable brake-shoe 8 is similarly provided with a base element 10, and on each of the base elements 9 and 10 I provide a suitable form of interlock adapted to cooperate with the friction element to be carried by the brake-shoe, such as a pair of longitudinally extending dovetail slides 14 secured to the member 9 in any suitable manner, as by spot welding, and adapted to engage with a friction element 15 at the position of coactingly shaped dovetailed grooves 16 therein.

The base element 10 for the brake-shoe 8 is provided with an interlocking flange 17 at its forward end, corresponding to the flange 13 on the base element 9, and a rearward interlocking flange 18 adapted to be disposed within a coactingly shaped transversely extending groove 18a in the flange member 5. An upstanding flange 19 is preferably provided at the rearward end of the member 10, and a buttress 20 may be provided on the flange 5 in position to bear against the upstanding flange 19 and resist any tendency for rearward sliding movement of the friction element 15 upon application of the braking effort by engagement of the friction element with a brake-drum or other relatively rotatable portion of the brake structure.

In order to lock the removable brake-shoes 7 and 8 in position upon the brake-shoe support 1, I provide, in this form of the invention, a transversely extending locking key 21 located adjacent the rearward end of the shoe 7 and the forward end of the shoe 8, slidably disposed within a transverse groove 22 in the flange portion 5. The locking key 21 is provided with a pair of opposing edge portions 23 tapered in consonance with and adapted to engage the two adjacent locking flanges 13 and 17 on the base elements 9 and 10. The locking key 21 is provided with a laterally projecting bolt or screw thread portion 24 which is adapted to be engaged by an adjustment nut 25 carried on a locking plate 26 as by engagement thereof within a groove 27 in the adjustment nut, suitable projecting studs 28 being provided upon the flange portion 5 in position to receive the plate 26, which may be held in place thereupon through the agency of nuts 29. Suitable keepers may be provided as at 30 and 31 to engage the flanges 11 and 18, mounted on projecting studs 32 and retained in place through the agency of nuts 33 on said studs.

In assembling the removable brake-shoes 7 and 8 upon the brake-shoe support 1, the following procedure may be followed: the removable brake-shoes 7 and 8, each having a removable friction element 15 mounted thereon by longitudinal sliding engagement upon the respective dovetail slides 14, said friction elements 15 being inserted upon the slides 14 until the respective forward and rearward ends thereof are in engagement with the upstanding flanges 12 and 19, are slidably disposed upon the brake-shoe support 1 by engaging the interlocking flanges 11 and 18 with the respective transverse grooves 11a and 18a in the support 1, and forcing the brake shoes laterally across the cylindrical surface 4 into abutment with the lateral flange edge projection 5a of the support. For convenience, the brake-shoe 8 may be applied first, and the brake-shoe 7 applied second, in view of the fact that some longitudinal latitude is provided in the transverse groove 11a, admitting of some movement of the shoe 7 with respect to the support 1 in a peripheral direction. The friction elements 15 are made of slightly greater peripheral length than the corresponding base elements 9 and 10 on which they are disposed, admitting of an adjustment or tightening operation through the agency of the locking key 21, which is inserted within the groove 22 in the portion 5 so as to force the opposing tapered edge or wedging shoulder portions 23 into engagement with the reentrant curves of the locking flanges 13 and 17 of the elements 9 and 10. As the locking key 21 is forced transversely of the support 1, into further engagement with the flanges 13 and 17, the brake-shoes 7 and 8 will be crowded toward one another, pulling the flange 11 of the element 9 in a rearward direction within the slot 11a until the adjacent ends 15a of the friction elements 15 are brought into positive abutment with one another. The crowding of the key 21 into engagement with the flanges 13 and 17 may conveniently be obtained by fastening the locking plate 26 in position upon the portion 5 and then turning the adjustment nut 25 disposed on the threaded bolt portion 24 of the key 21. The adjustment nut 25 may be of the so-called "stop-nut" type, so as to retain any established position of adjustment, or a suitable jamb nut (not shown) may be provided to retain the nut 25 in place, according to common practice. After adjustment of the nut 25 to the desired degree to effect compressive engagement of the adjacent ends 15a of the friction elements upon one another, the keepers 30 and 31 may be applied to the respective forward and rearward ends of the shoes 7 and 8, to cause the same to be retained in position with respect to the member 5 in use.

In order to prevent any outward jamming tendency at the position of the abutting ends of the members 15, as may result from the action of the wedging shoulders of the locking key 21, I may provide radially effective cooperating shoulders 27a and 22a on the key 21 and the groove 22, to constrain the key 21 and the members 7 and 8 against outward movement in a radial sense. The relative movement between the base members 9 and 10 in the tightening operation is conveniently obtained by allowing one of the members to move while retaining the other against movement; in the described form of invention, the base member 9 is adapted for minor longitudinal movement as by providing a longitudinally expanded slot 11a for the flange 11 while constraining such flange against outward movement, while the base member 10 is fixed against longitudinal movement as through the coactingly shaped flange 18 and groove 18a.

In use, the braking effort applied to the periphery of the elements 15 will be transmitted to the brake-shoe support 1 in part by frictional engagement upon the base members 9 and 10 thence through to the flange 5, and in part by thrust against the flange 11 or 19, depending upon the relative direction of rotation. This thrust is communicated from the element 15 on the shoe 8 onto the element 15 on the shoe 7, thence through to the flange 11, by reason of the compressional engagement of the opposing faces or ends 15a of the elements, and, vice versa, from the element on the shoe 7 through the element on the shoe 8 to the flange 19, which is re-inforced by the buttress 20. The two abutting elements 15 thus constitute a continuous braking surface, extending in the direction of the longitudinal interlock of such elements upon the respective base members 9 and 10, and the locking engagement of the brake-shoes upon the support 1 is obtained through transversely extending shoulder means.

When it is desired to remove the brake-shoes 7 and 8 from the brake-shoe support, as for replacement of the friction elements 15, it is merely necessary to remove the keepers 30 and 31, rotate the nut 25 to cause a retraction of the locking key 21 out of positive engagement with the flange portions 13 and 17 of the base elements 9 and 10, after which the nuts 29 may be removed and the locking key withdrawn from the groove 22. The brake-shoes 7 and 8 may then be tapped with a hammer to loosen the same, and withdrawn from engagement with the cylindrical flange 5 by a lateral sliding movement.

In the form of invention shown in Figs. 7 through 11, the removable brake-shoes are illustrated at 40 and 41, the brake-shoe 40 corresponding to the forward brake-shoe shown at 7 in Fig. 1 and the brake-shoe 41 corresponding to the rearward brake-shoe shown at 8 in Fig. 1. The respective brake-shoes are provided with base members 42 and 43 corresponding to base members 9 and 10 above, and each will be provided with a removable friction element 44 attached thereto as through the agency of longitudinally extending dovetail slides 45 corresponding to those above described at 14. The removable brake-shoes 40 and 41 are adapted to be mounted upon a brake-shoe support 46 provided with a cylindrical portion 47 having an upturned lateral edge portion 47a corresponding to portion 5a above. The shoe base member 42 is provided at its forward edge with an interlocking flange 48 adapted to slidably engage a transverse slot 49 in the member 46, and is preferably also provided with an upstanding flange portion 50 corresponding to the flange portion 12 above. The base member 43 of the removable brake-shoe 41 is provided at its rear end with a flange 51 which preferably extends radially outwardly and thence rearwardly to form (together with a reinforcing portion 51a which may be attached to the base member 43 in any suitable manner as by spot welding) a transverse open sided slot 52 carrying, preferably adjacent its central portion (in a lateral sense) a rearwardly inclined wedge 53. A coacting wedge 54, threadedly disposed upon a bolt 55 is adapted to be mounted with in the slot 52 for engagement with the wedge 53 on the flange 51. A recess 56 may be provided in the flange portion 47a to receive the head 57 of bolt 55, the bolt head being retained against dislocation through the agency of a retaining washer 58 and a snap ring 59. A back-up lug 60 is provided on the flange 47 in position to engage the rearward face 61 of the coacting wedge 54, and the bolt 55 is provided with means for rotating the same to secure a lateral movement of the wedge 54, such as a screw-driver slot 62. The back-up lug 60 is preferably provided with a recess or notch 60a at its forward under side, to receive the rearward edge of the reinforcing portion 51a to constrain the shoe 41 against radially outward dislocation in use.

The rearward end of the base member 42 and the forward end of the base member 43 are respectively provide with flange portions 63 and 64 adapted to be engaged by a bolt head 65 of a clamping bolt 66 mounted in the flange portion 47 substantially centrally thereof, so that upon tightening of the clamping nut 67 on the bolt 66 the flange portions 63 and 64 will be drawn downwardly, crowding the brake-shoes 40 and 41 into engagement with the cylindrical support portion 47. The portion 47 may conveniently be recessed as at 68 to receive the flange portions 63 and 64.

In the assembly of the brake-shoes 40 and 41 upon the brake-shoe support 46 the respective brake-shoes may be slidably disposed upon the cylindrical flange portion 47 of the support 46 by inserting the forward edge flange 48 of shoe 40 in the slot 49 and locating the rearward end of the shoe 41 in mating relation to the coacting wedge 54. In practice, the brake-shoe 41 is preferably applied first, where it may be readily passed by the coacting wedge 54, which will have been backed off by rotation of the bolt 55 until the wedge 54 is brought past the back-up lug 60, and then swung rearwardly, as indicated in dot-and-dash lines in Fig. 10. The shoe 40 may then be slidably disposed upon the flange 47 after the shoe 41 has been roughly located in place. The nut 67 is then taken up to a loose fit upon the flanges 63 and 64, and the coacting wedge 54 is moved into the slot 52 and then forced in the direction of the flange portion 47a by rotation of the bolt 55 until the mating inclined surfaces of the wedges 53—54 cause the brake-shoe 41 to be moved clockwise (Fig. 8), crowding against the shoe 40 and bringing the friction elements 44 into compressive engagement with one another at their abutting edges 44a, after which the nut 67 is tightened securely, further crowding the abutting edges 44a into engagement. A lock nut 55a may then be applied to bolt 55 to retain the desired adjustment position.

In use, the form of invention shown in Figs. 7 through 11 is entirely comparable in function to that first described, in that the flanges 50 and 51 oppose the thrust resulting from the application of the braking load upon the elements 44, and the two abutting elements 44 constitute, in effect, a continuous braking surface. When it is desired to remove the brake-shoes 40 and 41, the nut 67 may be loosened, the bolt 65 backed off to locate the wedge 54 in the dot-dash position of Fig. 10, and the shoes withdrawn laterally. To facilitate the withdrawal, a plurality of openings may be provided in the lateral margin of the base members, for engagement by a suitable hooked tool. To this end, the support 41 may be recessed as at 71, at a desired number of locations, and a short section 72 of the lateral edge of the base member deformed so as to be located within the recess and an opening 73 provided therein. A similar structure, or one of comparable function, may be provided for the first described form of invention if desired.

Other forms of the present device will occur to those skilled in the art, and although specific terms have been employed in the above description of two illustrative embodiments of this invention, they are used in a generic and descriptive sense only, and not for purposes of limitation, the intended scope of my invention being defined in the subjoined claims.

I claim:
1. A removable brake-shoe construction which comprises: a brake-shoe support provided with a cylindrical surface; a pair of removable brake-shoes adapted for mounting on said surface in longitudinally alined relation with adjacent ends thereof abutting one another, each of said brake-shoes comprising a base element and a friction element provided with longitudinally extending interlocking means in frictional sliding engagement with one another, said base elements being adapted to overlie said cylindrical surface and being each provided at their respective spaced ends with an upstanding flange portion adapted to constrain the respective friction elements against sliding movement toward said spaced ends; cooperating attachment means at said spaced ends and on said support adapting said base elements for transverse sliding engagement upon said support, and attachment means engaging said base elements at the adjacent ends thereof to constrain the same against movement in a radial direction away from said cylindrical surface, one of said attachment means comprising means adapted to engage one of said base elements and produce relative movement between said base elements in a direction such as to cause the adjacent ends of the friction elements to be brought into compressive abutting engagement with one another.

2. A construction as set forth in claim 1, said one attachment means being located at said adjacent ends of said base elements.

3. A construction as set forth in claim 1, said one attachment means being located at one of the spaced ends of said base elements.

4. A removable brake-shoe construction which comprises: a brake-shoe support provided with a cylindrical surface; a pair of removable brake-shoes adapted for mounting on said surface in longitudinally alined relation with adjacent ends thereof abutting one another, each of said brake-shoes comprising a base element and a friction element provided with longitudinally extending interlocking means in frictional sliding engagement with one another, said base elements being adapted to overlie said cylindrical surface and being each provided at their respective spaced ends with an upstanding flange portion adapted to constrain the respective friction elements against sliding movement toward said spaced ends; cooperating attachment means at said spaced ends and on said support adapting said base elements for transverse sliding engagement upon said support; and a locking member slidably disposed on said support for transverse movement with respect thereto, said locking member being provided with opposing shoulder means adapted to engage the adjacent ends of said base elements and to effect relative movement between said base elements in a direction toward one another.

5. A construction as set forth in claim 4, said locking member and said adjacent ends of said base elements being provided with interlocking portions adapted to constrain said adjacent ends against movement in a radial direction away from said cylindrical surface.

6. A construction as set forth in claim 4, said cooperating attachment means at said spaced ends and on said support, and said adjacent ends and said locking member being respectively provided with inter-engaging shoulder means adapted to constrain said brake-shoes against movement in a radial direction away from said cylindrical surface.

7. A removable brake-shoe construction which comprises: a brake-shoe support provided with a cylindrical surface; a pair of removable brake-shoes adapted for mounting on said surface in longitudinally alined relation with adjacent ends thereof abutting one another, each of said brake-shoes comprising a base element and a friction element provided with longitudinally extending interlocking means in frictional sliding engagement with one another, said base elements being adapted to overlie said cylindrical surface and being each provided at their respective spaced ends with an upstanding flange portion adapted to constrain the respective friction elements against sliding movement toward said spaced ends; cooperating attachment means on one of said spaced ends and on said support adapting one of said base elements for transverse sliding engagement upon said support and including cooperating shoulder means constraining said one base element against movement in a radial movement away from said cylindrical surface; cooperating attachment means on said adjacent ends of said base elements and on said support adapting said adjacent ends for minor longitudinal movement while constraining the same against movement in a radial direction away from a cylindrical surface; and means for engaging the other end of the other of said base elements and for effecting longitudinal movement of said other base element toward said one base element to cause the adjacent ends of the friction elements to be brought into compressive abutting engagement with one another.

8. A removable brake-shoe construction which comprises: a brake-shoe support provided with a cylindrical surface; a pair of removable brake-shoes adapted for mounting on said surface in longitudinally alined relation with adjacent ends thereof abutting one another, each of said brake-shoes comprising a base element and a friction element provided with longitudinally extending interlocking means in frictional sliding engagement with one another, said base elements being adapted to overlie said cylindrical surface and being each provided at their respective spaced ends with an upstanding flange portion adapted to constrain the respective friction elements against sliding movement toward said spaced ends; cooperating attachment means at said spaced ends and on said support adapting said base elements for transverse sliding engagement upon said support; and locking means adapted to interlock the adjacent ends of said base elements, said locking means comprising a wedge member slidably disposed on said support for sliding movement transversely thereof, and provided with a pair of divergent shoulder members adapted to engage the respective adjacent ends of said base elements and cause the same to move relatively toward one another upon transverse movement of said wedge member.

9. A construction as set forth in claim 8, and comprising in addition, adjustment means anchored to said support and coacting with said wedge member for effecting such transverse movement of said wedge member.

10. A construction as set forth in claim 8, said wedge member being provided with a threaded member projecting therefrom along the axis of such transverse movement, and said construction comprising in addition: adjustment means anchored to said support and provided with a rotatable member threadedly engaging said threaded member, and rotatable to effect such transverse movement of said wedge member.

PAUL R. McEACHRAN.

REFERENCES CITED

The following references are of record in the file of this patent:

UNITED STATES PATENTS

| Number | Name | Date |
| --- | --- | --- |
| 1,117,366 | Gallagher | Nov. 17, 1914 |
| 1,520,701 | Down | Dec. 30, 1924 |
| 1,953,217 | Evans | Apr. 3, 1934 |
| 2,027,823 | Hoffman | Jan. 14, 1936 |
| 2,153,341 | Ruffino | Apr. 4, 1939 |